No. 778,718.        Patented December 27, 1904.

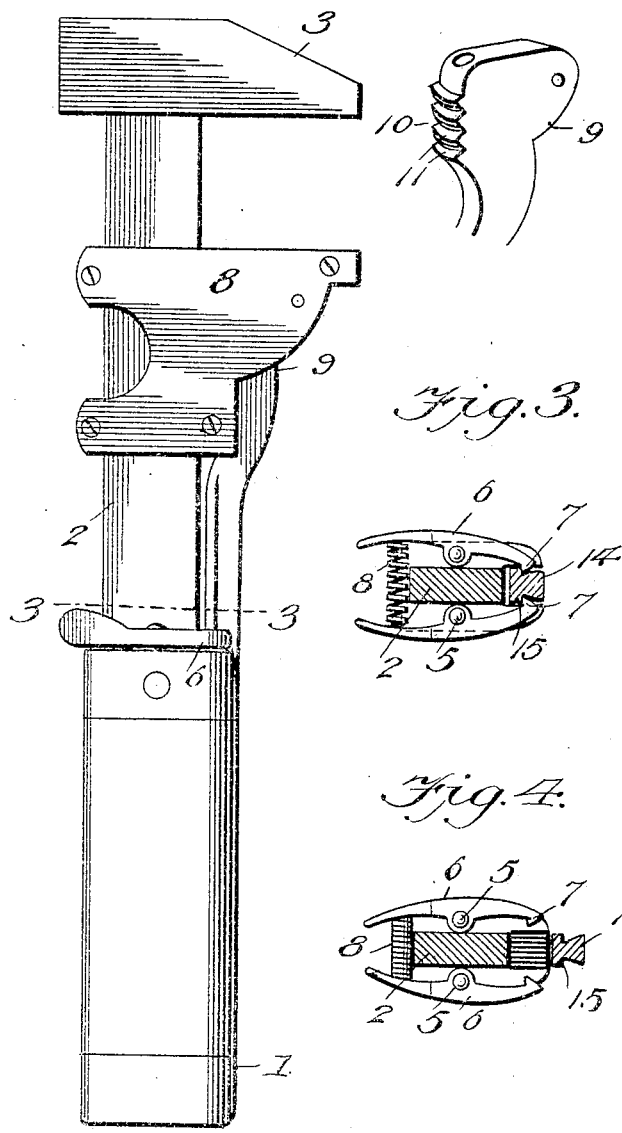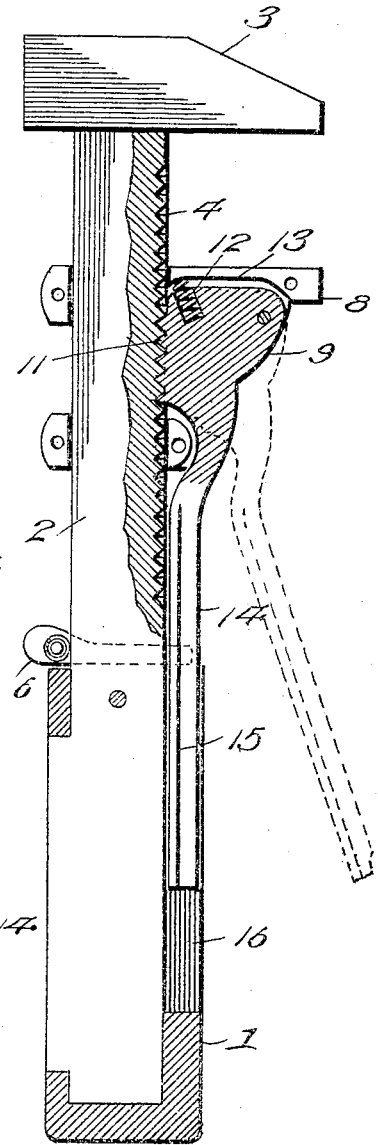

UNITED STATES PATENT OFFICE.

MATILDA F. STEENBERGE, OF NORTH BANGOR, NEW YORK, ADMINISTRATRIX OF LESLIE T. STEENBERGE, DECEASED.

WRENCH.

SPECIFICATION forming part of Letters Patent No. 778,718, dated December 27, 1904.

Application filed February 6, 1904. Serial No. 192,390.

*To all whom it may concern:*

Be it known that I, MATILDA F. STEENBERGE, a citizen of the United States, residing at North Bangor, in the county of Franklin and State of New York, am the administratrix of the estate of LESLIE T. STEENBERGE, deceased, who invented new and useful Improvements in Wrenches, of which the following is a specification.

The invention relates to new and useful improvements in wrenches; and its object is to provide a device of this character having a slide which can be quickly and securely locked in adjusted position.

The invention also consists in providing a jaw-fastening device which will automatically unlock the jaw from the shank, so as to permit it to be quickly adjusted.

With the above and other objects in view the invention consists of a shank having recesses in one face thereof adapted to be engaged by teeth of novel form arranged upon one face of a locking-dog pivoted in a sliding jaw. A spring is interposed between the inner end of the dog and the jaw, so as to hold the teeth normally removed from the shank upon which the jaw is located. An arm extends from the dog and is adapted to be locked against the shank, so as to hold the dog and shank securely fastened together, and thereby prevent movement of the sliding jaw.

The invention also consists in the further novel construction and combination of parts hereinafter more fully described and claimed, and illustrated in the accompanying drawings, showing the preferred form of the invention, and in which—

Figure 1 is a side elevation of a wrench constructed in accordance with the invention. Fig. 2 is a longitudinal section therethrough, a portion of the shank being shown in section. Fig. 3 is a section on line 3 3, Fig. 1. Fig. 4 is a similar section showing the arm of the dog released, and Fig. 5 is a detail view of a portion of the dog and showing the peculiar contour of the teeth thereon.

Referring to the figures by numerals of reference, 1 is a handle having a shank 2 extending therefrom and provided at one end with a stationary jaw 3. Recesses 4 are formed within one face of the shank 2 and extend transversely thereof, said recesses having their inner walls concaved. Pivot-pins 5 extend from the inner end of the handle 1 and at opposite sides of the shank 2, and on these pins are mounted levers 6. A head 7 is formed at one end of each lever, while a spring 8 is interposed between and secured to the other ends of the levers and serves to hold the heads 7 normally pressed toward each other. A sliding jaw $8^a$ is mounted upon the shank and has a dog 9 pivoted therein. This dog has a working face 10, on which are arranged teeth 11, and each tooth is preferably convexed from end to end, so as to fit snugly within one of the corresponding recesses 4, before referred to. The side walls of the teeth are also inclined, so as to enable them to readily move into position within the recesses. A spring 12 is interposed between one end of the dog 9 and the inner wall of the recess 13, in which the dog is located. This spring serves to hold the dog normally out of contact with the shank. An arm 14 is formed integral with the dog and extends therefrom and has beads 15 arranged at opposite sides thereof. These beads are adapted to be automatically engaged by the heads 7 and the levers 6. A groove 16 is formed longitudinally within the handle 1 for the reception of the arm 14.

It will be understood that the dog and its arm are normally in the position illustrated in dotted lines in Fig. 2. When it is desired to adjust the jaw $8^a$ and lock it, the same is moved longitudinally upon the shank 2 until it has reached a desired position. Arm 14 is then swung inward toward shank 2, and the rounded teeth 11 are thereby seated within the recesses 4. Beads 15 contact with the ends of the heads 7 and force them laterally in opposite directions, thereby compressing spring 8. After these beads pass the heads 7 will swing into position over the beads, and thereby lock the arm within the groove 16. Further adjustment of the jaw $8^a$ is thus prevented until the arm 14 has been released from the heads 7. When it is desired to release the jaw, the spring-pressed ends of levers 6 are pressed toward each other, thereby freeing the arm 14, and the spring 12, which is tensioned by the inward movement of arm 14, immediately throws said arm outward and withdraws teeth 11 of dog 9 from the recesses 4.

It will be seen that this device is extremely simple and inexpensive in construction and permits the sliding jaw to be quickly locked in adjusted position.

In the foregoing description is shown the preferred form of the invention, but the invention is not limited thereto, as modifications may be made therein without departing from the spirit or sacrificing any of the advantages thereof. The right is therefore reserved to make such changes as fairly fall within the scope of the invention.

Having thus described the invention, what is claimed as new is—

1. The combination with a longitudinally-grooved handle having a shank extending therefrom in alinement with the groove, and a fixed jaw upon the shank; of a recessed jaw slidably mounted upon the shank, a spring-pressed dog pivoted within the sliding jaw, teeth upon the dog adapted to be seated in recesses in the shank, an arm extending from the dog and adapted to be seated within the groove in the handle, beads extending longitudinally on the sides of the arm, hooked levers pivoted to one end of the handle at opposite sides of the shank and adapted to engage the beads and lock the arm within the groove, and a spring interposed between the levers for holding the same normally in engagement with the arm.

2. The combination with a handle having a shank extending therefrom, and a fixed jaw upon the shank; of a recessed jaw slidably mounted upon the shank, a dog pivoted within the recesses, a spring seated within the dog and adapted to contact with the sliding jaw and exert an outward tension upon the dog, teeth upon the dog adapted to be seated in recesses within the shank when the spring is compressed, an arm extending from the dog, longitudinally-extending beads thereon, oppositely-disposed hooked levers pivoted at opposite sides of the shank, and a spring interposed between the levers for holding them normally in engagement with the beads.

In testimony whereof I affix my signature in presence of two witnesses.

MATILDA F. STEENBERGE,
*Administratrix of the estate of Leslie T. Steenberge, deceased.*

Witnesses:
CHARLIE R. GIBBS,
JANE A. GIBBS.